(12) United States Patent
Smith et al.

(10) Patent No.: US 8,938,693 B2
(45) Date of Patent: Jan. 20, 2015

(54) SYSTEMS AND METHODS FOR MANAGING INSTANTIATION OF INTERFACE OBJECTS

(75) Inventors: Albert Gordon Smith, San Francisco, CA (US); Glenn Warren Ruehle, Novato, CA (US); Eliot Greenfield, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 998 days.

(21) Appl. No.: 13/036,077

(22) Filed: Feb. 28, 2011

(65) Prior Publication Data

US 2014/0250420 A1    Sep. 4, 2014

Related U.S. Application Data

(63) Continuation of application No. 10/796,785, filed on Mar. 8, 2004, now Pat. No. 7,913,177.

(51) Int. Cl.
    *G06F 3/14*    (2006.01)
(52) U.S. Cl.
    USPC ........... 715/853; 715/201; 715/513; 700/100; 382/186
(58) Field of Classification Search
    CPC ..................................... G06F 3/14; G06F 3/17
    USPC .......... 715/200–277, 700–867; 700/701–866; 709/201–229; 705/50–79; 345/30–111; 707/100; 382/186
    IPC .................................................. G06F 3/14, 3/17
    See application file for complete search history.

(56) References Cited

U.S. PATENT DOCUMENTS

| | | | |
|---|---|---|---|
| 5,515,487 A | 5/1996 | Beaudet et al. | |
| 5,673,401 A | 9/1997 | Volk et al. | |
| 6,178,432 B1 * | 1/2001 | Cook et al. | ................... 715/201 |
| 6,636,250 B1 | 10/2003 | Gasser | |
| 6,941,521 B2 | 9/2005 | Lin et al. | |
| 7,073,122 B1 | 7/2006 | Sedghi | |
| 7,096,163 B2 | 8/2006 | Reghetti | |
| 7,287,018 B2 | 10/2007 | Lennon | |
| 7,559,034 B1 | 7/2009 | Paperny et al. | |
| 7,913,177 B1 | 3/2011 | Smith et al. | |
| 2002/0085028 A1 | 7/2002 | Tabatabai et al. | |
| 2002/0156814 A1 | 10/2002 | Ho | |

(Continued)

OTHER PUBLICATIONS

Urbieta et al., Designing the Interface of Rich Internet Applications, Fifth Latin American Web Congress IEEE, 2007, pp. 144-153.

*Primary Examiner* — Ruay Ho
(74) *Attorney, Agent, or Firm* — Kilpatrick Townsend & Stockton LLP (57) ABSTRACT

A system and method are described for managing instantiation of interface elements in a rich Internet application (RIA) that includes systematically creating a tree of descriptive nodes that describe the visual interface elements of the application. Only interface elements that are not stacked under other objects or not fully hidden on the screen are instantiated using the corresponding descriptive nodes. Detail objects corresponding to the descriptive nodes are then constructed and used by a rendering engine to render the visual interface elements of the declarative application. As the user moves to locations within the application that are stacked under other objects or are hidden, the descriptive nodes and detailed objects are created representing the interface elements of those locations for rendering by the rendering engine.

20 Claims, 5 Drawing Sheets

(56) References Cited

U.S. PATENT DOCUMENTS

| | | |
|---|---|---|
| 2003/0001893 A1 | 1/2003 | Haley |
| 2003/0172345 A1 | 9/2003 | Engelsberg et al. |
| 2003/0184585 A1 | 10/2003 | Lin et al. |
| 2004/0111673 A1 | 6/2004 | Bowman et al. |
| 2004/0122789 A1 | 6/2004 | Ostertag et al. |
| 2004/0230900 A1* | 11/2004 | Relyea et al. ............... 715/513 |
| 2005/0038796 A1* | 2/2005 | Carlson et al. ............... 707/100 |
| 2006/0062467 A1* | 3/2006 | Zou et al. .................... 382/186 |
| 2006/0200535 A1 | 9/2006 | Moser |

* cited by examiner

SYSTEMS AND METHODS FOR MANAGING INSTANTIATION OF INTERFACE OBJECTS

CROSS-REFERENCE TO RELATED APPLICATION AND PRIORITY CLAIM

The present application is a continuation of U.S. patent application Ser. No. 10/796,785, filed Mar. 8, 2004 and titled, "A System and Method for Managing Instantiation of Interface Elements in Rich Internet Applications," which is incorporated by reference herein in its entirety.

TECHNICAL FIELD

The present invention relates, in general, to rich Internet applications (RIAs), and, more specifically, to the deferred instantiation of interface elements in RIAs.

BACKGROUND OF THE INVENTION

Over the last ten years, computers and computing technology have grown in leaps and bounds due, in no small part, to the growth and reach of the Internet. Computer applications, once written in procedural programming languages and mostly self-contained on each computer desktop, now are increasingly being written to include non-procedural programming languages with regular interaction across a data network, such as the Internet, for retrieving, not only data, but application logic as well.

Procedural languages, such as C/C++, FORTRAN, MICROSOFT CORPORATION'S VISUAL BASIC™, and the like, implement application functionality through properly ordered steps and actions. In contrast, non-procedural languages, such as Hypertext Markup Language (HTML), MACROMEDIA, INC.'s MXML™, which is a specialized, XML-based language for developing RIAs in MACROMEDIA, INC.'s FLEX™ development environment, and the like, define the final appearance of an application's user interface without specifying a time-based sequence of steps for constructing that interface. These non-procedural languages, also known as declarative languages, are extensively used in Internet technology. Web pages are defined by the underlying HTML. When a browser requests a Web page, the entire page is defined. In typical RIA, procedural languages may be used to define the programming logic, while the non-procedural languages are used to define the visual interface elements.

RIAs are one area in which the growth of declarative applications has coupled with a growth in Internet or network interaction. RIAs combine the usability of a desktop application with the administrative advantages of the Internet. Formerly, the client-server framework powered many Internet related applications. In the client-server paradigm, the client computer acts mostly as a display unit. The majority of processing occurs remotely on the server, while the results are displayed on the client. While this functionality extends the powerful processing of large centralized servers to individual users, network latency leads to delays in the operation of client-server applications. Even with the large increases in available high speed bandwidth, network latency still exists.

RIAs, however, provide for much of the processing to be completed on the client computer. The RIAs are stored remotely on Internet-accessible servers. When the client requests access, the computer logic defining the RIA, or at least large portions thereof, is downloaded and run completely on the client computer. Desktop and handheld computers have become faster and more powerful, and with large amounts of storage space. Therefore, complex data and rich graphics may be processed and rendered quickly. Moreover, because of the prevalence and speed of today's Internet access, these RIAs may be continually updated with data in order to provide a rich graphical and informational experience in a real-time world.

Because RIAs typically rely on rich graphical presentation, graphically oriented containers are generally used on each client to run the rich application. For example, interactive information and graphical players, such as MACROMEDIA INC.'s MACROMEDIA FLASH™ PLAYER, SUN MICROSYSTEMS' JAVA™ VIRTUAL MACHINE™ (JVM™), and the like, are used to execute RIAs on the client. These interactive, information and graphical players typically run monolithic files, such as Small Web File (SWF) format for MACROMEDIA FLASH™ PLAYER and JAVA™ applets for the JVM™. SWF files and JAVA™ applets generally consist of bytecode that runs on the virtual machine of the player. The use of virtual machines increases the cross-platform compatibility of such applications. Software manufacturers, such as MACROMEDIA, INC., SUN MICROSYSTEMS, INC., MICROSOFT CORPORATION, and the like, create different virtual machines to play on various different computer platforms. However, the bytecode format remains constant and compatible with its designed player, while the player is customized to the particular computer platform.

When a user selects to access a RIA, the underlying bytecode is downloaded to the user's computer for execution on the graphical player. Merely downloading the bytecode file to the user's computer takes relatively little time, at least over a broadband Internet connection. Once there, each piece of bytecode directs the multimedia player to perform some single step or single function of the application, such as creating objects that may then be rendered onto the display by the players. While the execution of a few steps also does not typically take much time, the execution of all of the bytecode to instantiate and render each of the graphical interface elements in addition to the download time creates a substantial delay in the user's experience of the RIA. Once this process has completed, interaction with the RIA is extremely fast. However, the initial start-up delay may be long enough to cause many users to quit the RIA before even being able to access it. Thus, the current solutions for delivering high quality RIAs based on declarative languages provide a less than desirable experience for the user at start up.

BRIEF SUMMARY OF THE INVENTION

Representative embodiments of the present invention are directed to a system and method for deferring the instantiation of selected interface elements of a declarative software application until a user navigates to a particular location. As a declarative software application is downloaded to a client computer, a descriptive hierarchical data structure or descriptor tree of the application is developed. This descriptive hierarchical data structure merely describes the presentation of the visual elements and, therefore, utilizes much less processing overhead than the actual instantiation of each of the application's interface elements in the presentation container. Certain visual elements, such as menu items, typically provide immediate access to user interactions, and therefore, are instantiated in advance. However, in certain stacked navigation elements, such as tabbed or accordion groups of panes or views, typically only the active pane or view is visible to the user at anyone time. Therefore, instantiation of the objects resident on the hidden panes or views is generally unnecessary until the user navigates to the hidden pane or view.

In operation, the initially visible elements of the application are fully rendered and displayed within the presentation container while the initially unseen elements in the descriptive hierarchical data structure or descriptor tree remain descriptive. The multimedia player rendering the visible display elements uses an object tree created from the descriptor tree to render the visual elements. The nodes of the hierarchical outline, as well as the object tree, that represent stacked visual elements are created according to a user's navigation. Therefore, the user experiences a limited delay at start up. For example, if each view takes half of a second to be instantiated, the user experiences the half-second delay as opposed to the much longer display should all of the views of the application be instantiated before execution begins. If there were 100 views in the application, a half-second per view delay would translate into a 50 second delay at start up.

Once interface elements are instantiated, they remain instantiated in memory. Therefore, as the user continues to navigate through the application, more of the hierarchical outlines becomes instantiated allowing the graphical player to re-render each interface element very quickly when the user returns to any previously viewed pane or view. Furthermore, each subsequent navigation to one of the previously viewed interface elements is delivered without the initial instantiation delay, thus, further improving the user's interaction experience with the application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
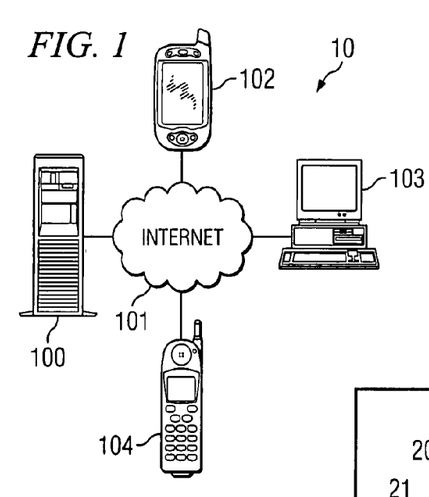
FIG. 1 is a block diagram illustrating a framework suitable for delivering rich or thin applications to client users.

FIG. 1 is a block diagram illustrating framework 10 suitable for delivering rich or thin applications to client users 102-104. Server 100 maintains a remote application that may be delivered to one or more of clients 102-104 over Internet 101. For purposes of describing the various embodiments of the present invention, framework 10 is used in delivering a RIA to clients 102-104. In operation, client 102 may access server 100 over Internet 101 to request use of a RIA. Server 100 responds by transmitting the RIA back to client 102, again using Internet 101.

Figure 2:
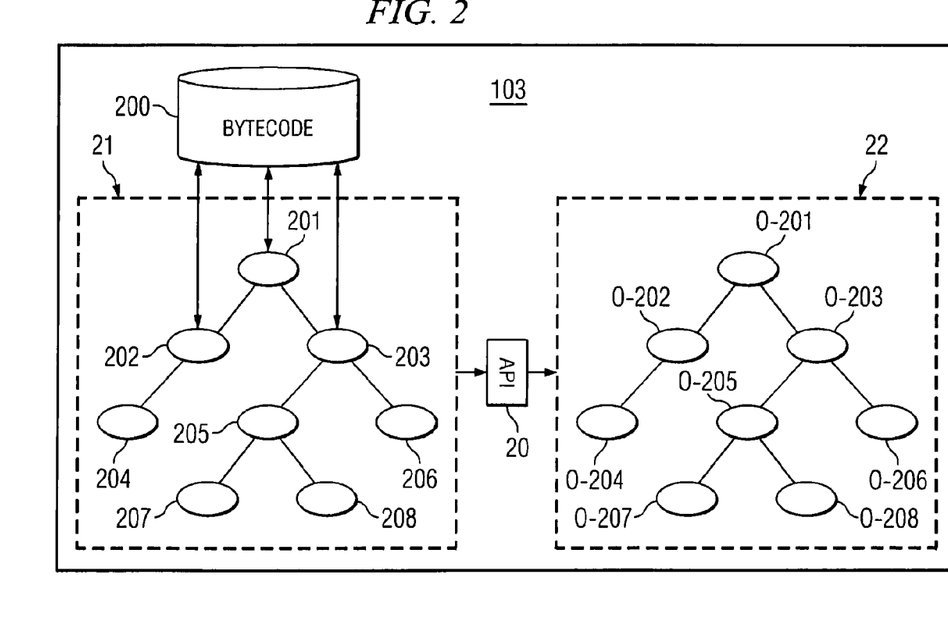
FIG. 2 is a block diagram illustrating one embodiment of the present invention.

FIG. 2 is a block diagram illustrating one embodiment of the present invention. A user at computer 103 accesses a RIA developed according to one embodiment of the present invention. For example, the RIA may have been developed using MACROMEDIA INC.'s MXML™ development language. The MXML™ file defining the RIA is compiled into a SWF file and cached at the remote server. When the user points the browser to the RIA, the corresponding SWF file is downloaded to computer 103 and executes the SWF using its compatible graphics player, for example MACROMEDIA INC.'s MACROMEDIA FLASH™ player. The SWF file contains bytecode storage 200 that will be eventually used by the MACROMEDIA FLASH™ player to implement the RIA. However, instead of completely executing the bytecode in bytecode storage 200 on the MACROMEDIA FLASH™ player to directly create each object in the object tree that is to be rendered for the RIA on the player, which would cause an unacceptable delay in execution, intermediate processing steps are performed to decrease this delay.

The SWF file and its bytecode in bytecode storage 200 initiate the creation of descriptor tree 21, which will eventually be constructed of application descriptor node 201 and descriptor nodes 202-208. A descriptor node is a data structure that contains descriptions for a single object or single container of the RIA. The description comprises the properties of each object or the properties of each container that the node represents. This description may closely resembles the code structure written in the declarative language, such as MXML™ which was used in developing the example depicted in FIG. 2. In normal application, a developer, using MXML™ in the present example, will only define the object properties that vary or differ from default properties of the particular objects. Objects represent any type of screen items such as a pane container, buttons, fill-in fields, menus, navigators, and the like. For example, the developer may define the text of a button label in MXML™. This defined text would then be included in the button object descriptor for that button. Similarly, the background color, width, and height for a container, and the like, may be included in the descriptor node representing the container object. The descriptor nodes for these objects would, therefore, include the descriptions of the properties defined in the MXML™ code that vary from the default properties of those objects.

In contrast, the actual object, which the graphical player uses to render the graphical representation on its display, contains not only the custom properties of the object, but also each and every other property within the default definition of that object. Therefore, the object that is used by the graphical player contains much more data and information than its descriptor. The smaller amount of data and information in the intermediate descriptor node decreased the amount of time to transmit the bytecode for it across Internet 101.

The first node in descriptor tree 21 that is created by the SWF and the bytecode in bytecode storage 200 is application descriptor node 201. Application descriptor node 201 includes a description of the properties of the application plus child constructor methods for creating each of the child nodes of application descriptor node 201. These child constructor methods are code logic that contain pointers to specific bytecode in bytecode storage 200 that the graphical player engine uses to create each of the descriptor child nodes of application descriptor node 201, descriptor nodes 202 and 203. Similarly, descriptor nodes 202 and 203 each have described properties and their own child constructor methods with pointers to bytecode storage 200 for creating their children, descriptor nodes 204-206. Thus, each descriptor node in descriptor tree 21 includes property descriptions for its representative object or container object and, possibly, a child constructor method that points to some bytecode in bytecode storage 200 for creating its children, if any such children exist.

In example operation, descriptor node 202 may represent a container that ultimately represents a pane displayed by the graphical player. Descriptor node 202 would, therefore, contain descriptions such as, among others, the pane height and width along with a background color and a child constructor method to create descriptor node 204. Descriptor node 204 may represent a button located on the pane described by descriptor node 202. Because descriptor node 204 represents a visible object within the pane represented by descriptor node 202, the child constructor method of descriptor node 202 is called and executed to create descriptor node 204. Descriptor node 204 may then include the button text, possibly a button color, or the like.

Descriptor node 203 may represent a tab navigation container (i.e., a tabbed pane). Descriptor node 203 would include its property descriptors such as height, width, background color, and the like, and the child constructor methods for constructing descriptor nodes 205 and 206, which may represent the containers for each of the tabs in the tabbed navigation container. Because descriptor nodes 205 and 206 represent the child views of the tabbed navigation container, it is known that only the contents of one of those views will be visible to the user at anyone time when it is rendered on the display by the graphical player. Thus, the views in the tabbed navigation container are stacked in relation to each other. As a result, the child constructor methods are called first only for descriptor node 205 to create descriptor nodes 207 and 208, which may represent a button and possibly a text box to be displayed on the first view of the tabbed pane that will be rendered and displayed by the graphical container. Therefore, any children that descriptor node 206 may have are not instantiated when the user is viewing the first view of the tabbed pane represented by descriptor nodes 203, 205, 207 and 208. This delaying or deferring the instantiation of the hidden object descriptors in such stacked navigation objects saves processing time and increases the speed with which the application is rendered and displayed to the user. If a user were to navigate then to the tab view represented by descriptor node 206, the child descriptor methods of descriptor node 206 may be called to generate any child descriptor nodes that it may have. These child nodes would represent the contents of that view.

It should be noted that in various alternative and additional embodiments of the present invention, various methods may be used to note the information of whether a particular object is a stacked or unstacked object. For example, the information that a particular object or container object is stacked or unstacked may be contained in descriptor node 203, which may indicate itself as a stacked container. Similarly, the information may be contained in each of descriptor nodes 205 and 206, which may indicate that they are members of a stacked object. Various embodiments of the present invention may implement this information in a number of different ways.

In practice, in order to graphically render the RIA on the display, the descriptor nodes of descriptor tree 21 are converted into object nodes that contain every one of the object properties that the graphical player uses to render the visual elements onto the display. As each of the descriptor nodes of descriptor tree 21 is created, the descriptor node is processed by application programming interface (API) 20, which converts the description into the renderable object within object tree 22. Thus, descriptor tree 21 and object tree 22 are created and unfolded in parallel. The graphical player then uses each of object nodes O-201-O-208 to render the visual elements for the RIA onto the display of computer 103.

It should be noted that any order of converting the descriptor nodes of descriptor tree 21 into the object node of object tree 22 may be employed. For example, a descriptor node may be processed by API 20 immediately after its creation, or may be processed after completing the creation of each descriptor node of a particular tree level, or may be processed after completing the creation of each descriptor node in the deferred version of descriptor tree 21.

Figure 3A:
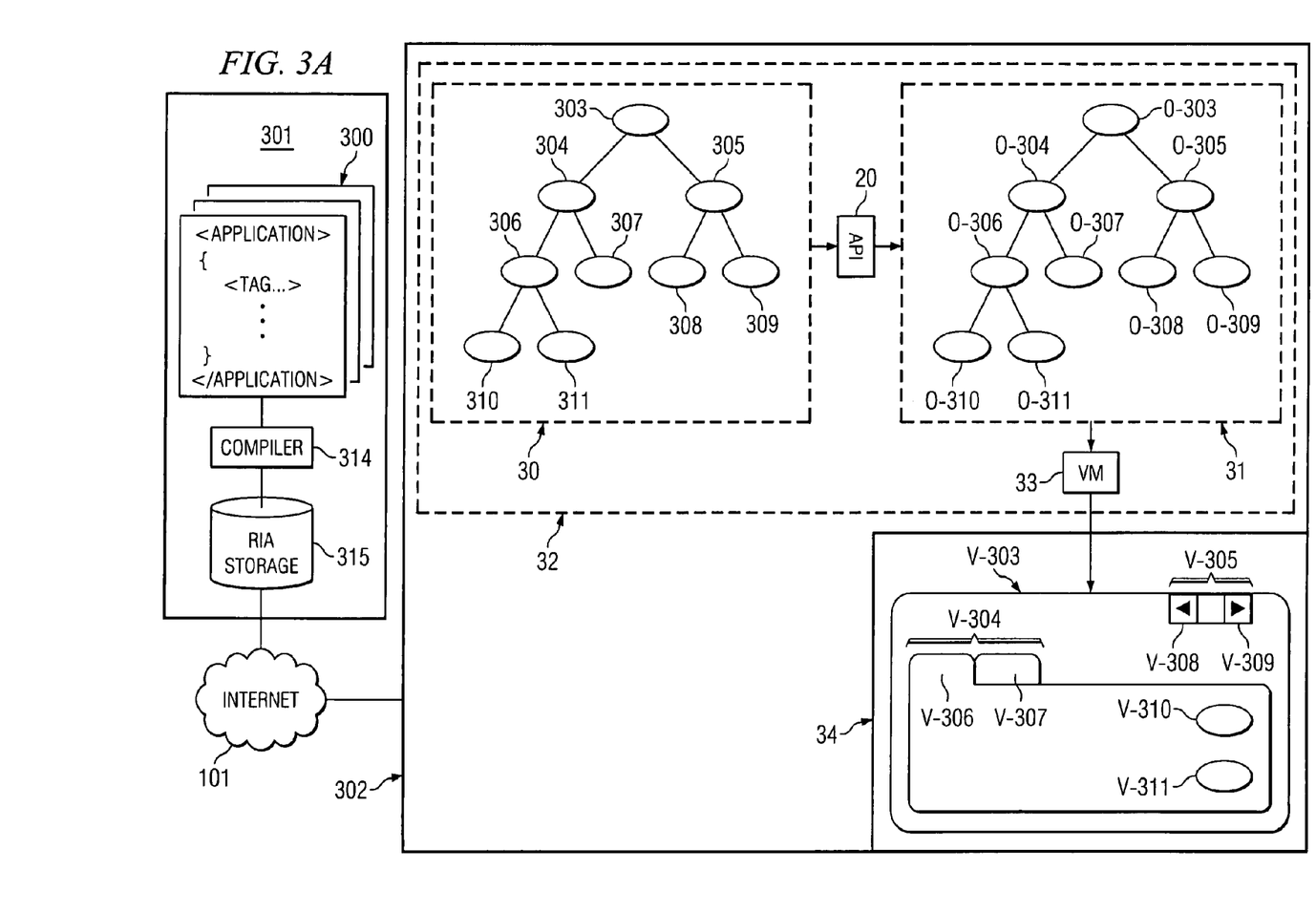
FIG. 3A is a block diagram illustrating another embodiment of the present invention.

FIG. 3A is a block diagram illustrating another embodiment of the present invention. RIA 300 is typically programmed in a language that defines high user interactivity and graphical presentation, such as MACROMEDIA INC.'s MXML™. RIA 300 is then compiled by compiler 314 on remote server 301 to produce the executable file that will render RIA 300. The executable file may then be stored in RIA storage 315 that may be accessible by users desiring to operate RIA 300. A user at computer device 302 accesses remote server 301 over Internet 101 to select execution of RIA 300. The executable file stored in RIA storage 315 is then generally downloaded to computer device 302 for operation. Computer device 302 includes multimedia player 32, which executes the executable file downloaded from remote server 301. An example of multimedia player 32 may be MACROMEDIA INC.'s MACROMEDIA FLASH™ player.

Display 34 illustrates the view that the user first views on the start up of RIA 300 on computer device 302. RIA 300 is represented by the visual rendering of application pane V-303. Application pane V-303 includes container V-305 that has two buttons, buttons V-308 and V-309. Application pane V-303 also includes tabbed navigation container V-304 that has two tab views, tab view V-306, which is shown with buttons V-310 and V-311, and tab view V-307, which is concealed under tab view V-306 in the navigation stack. However, in order to get to this point visually on display 34, multimedia player 32 first creates descriptor tree 30 and object tree 31.

When the executable file is received at computer device 302, multimedia player 32 begins execution by creating application descriptor node 303. Application descriptor node 303 represents RIA 300. API 20 then converts application descriptor node 303 into application object O-303 of object tree 31. Application object O-303 is then used by virtual machine 33 to render the background, color, size, shape, and various other properties of application pane V-303 on display 34. After calling the child constructor methods of application descriptor node 303, multimedia player 32 then causes the creation of descriptor nodes 304, representing tabbed navigation container V-304 and descriptor node 305, representing container V-305. API 20 converts descriptor nodes 304 and 305 into object nodes O-304 and O-305, which virtual machine 33 uses to render tabbed navigation container V-304 and container V-305.

Descriptor node 306 and 307 are created from descriptor node 304, which represent tab views V-306 and V-307 of tabbed navigation container V-304. Similarly, descriptor nodes 308 and 309 are created which represent buttons V-308 and V-309 of container V-305. API 20 converts each of descriptor node 306 -309 into their corresponding object nodes O-306-O-309, which virtual machine 33 uses to render tab views V-306 and V-307 of tabbed navigation container V-304 and buttons V-308 and V-309 of container V-305, respectively.

In the embodiment shown in FIG. 3A, descriptor node 304 contains information that tells multimedia player 32 that it represents a stacked object. Therefore, multimedia player 32 determines which of the tabbed views is on top of the stack. Because tab view V-306 is shown on display 34, multimedia player 32 causes descriptor nodes 310 and 311 to be created from descriptor node 306. Descriptor nodes 310 and 311 represent buttons V-310 and V-311 shown on tab view V-306. API 20 converts each of descriptor nodes 310-311 into their corresponding object nodes O-310-O-311, which virtual machine 33 uses to render buttons V-310 and V-311 on tab view V-306. At this point, because each of the visual elements visual to the user have been rendered on display 34, instantiation of the interface elements of RIA 300 temporarily ceases while the user remains on the view shown in application pane V-303.

Figure 3B:
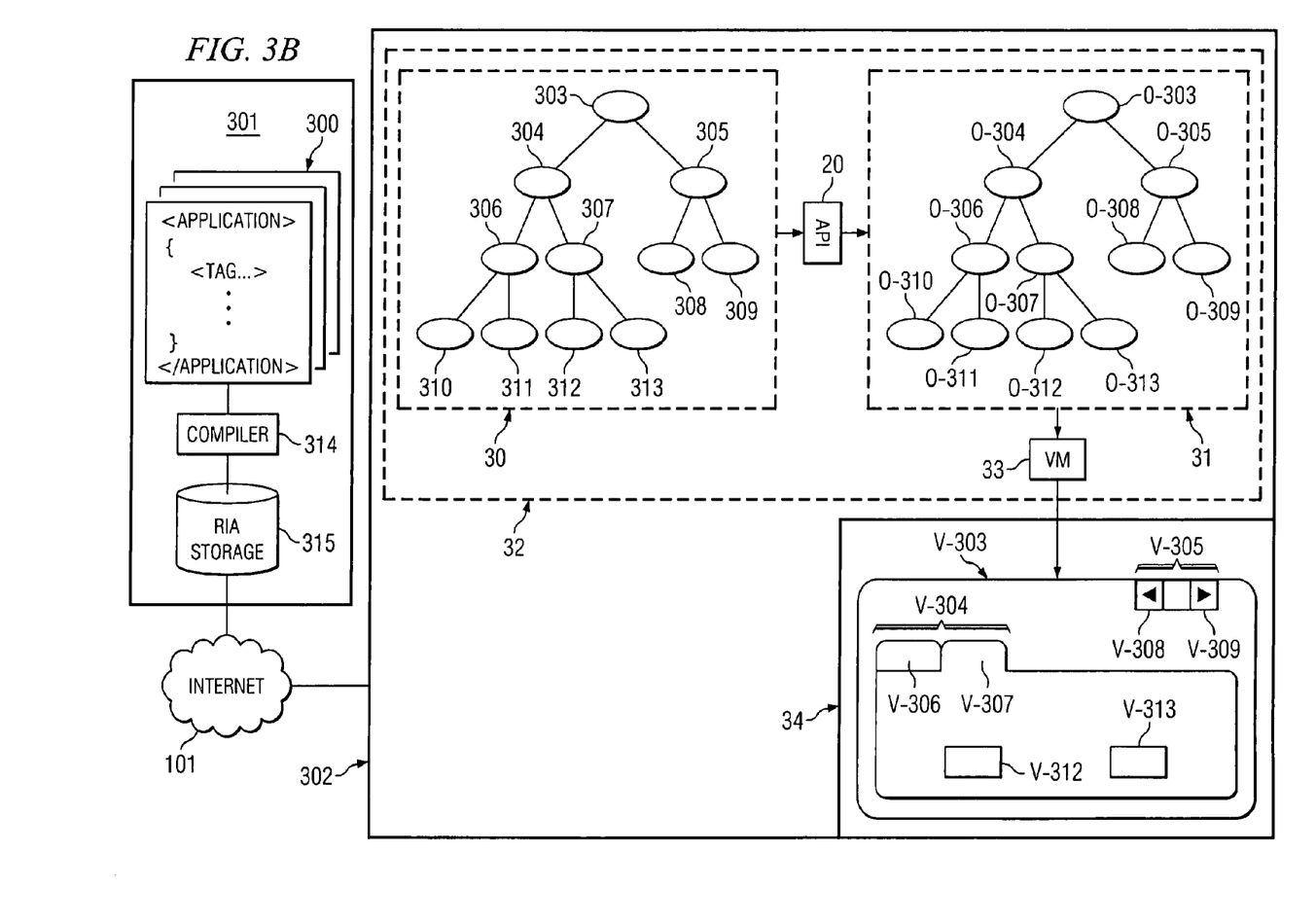
FIG. 3B is a block diagram illustrating another embodiment of the present invention after a user has navigated deeper into RIA.

FIG. 3B is a block diagram illustrating another embodiment of the present invention after a user has navigated deeper into RIA 300. From the view shown in FIG. 3A, the user selects the tab button to navigate to the second view of tabbed navigation container V-304. In doing so, application pane V-303 changes as shown in FIG. 3B. Now, tabbed navigation container V-304 shows tab view V-307 on display 34. When the user selected the tab for tab view V-307, multimedia player 32 caused the creation of descriptor nodes 312 and 313 from descriptor node 307. API 20 then converted descriptor nodes 312 and 313 into object nodes O-312 and O-313 in object tree 31. Virtual machine 33 used object nodes O-312 and O-313 to render buttons V-312 and V-313 onto tab view V-307 of tabbed navigation contain V-304. The user experiences a slight navigation delay while descriptor nodes 312 and 313, and object nodes 0-312 and O-313 are instantiated, and further while object nodes O-312 and O-313 are rendered as buttons V-312 and V-313. However, by delaying the instantiation of the interface elements until a user navigates to a particular view, the time for starting up RIA 300 is reduced.

FIG. 3B illustrates descriptor nodes 310 and 311, as well as object nodes O-310 and O-311 remaining within multimedia player 32. Once instantiated, the objects remain in memory to increase the efficiency of future navigation back to the views that have already been displayed to the user on display 34.

Figure 4:
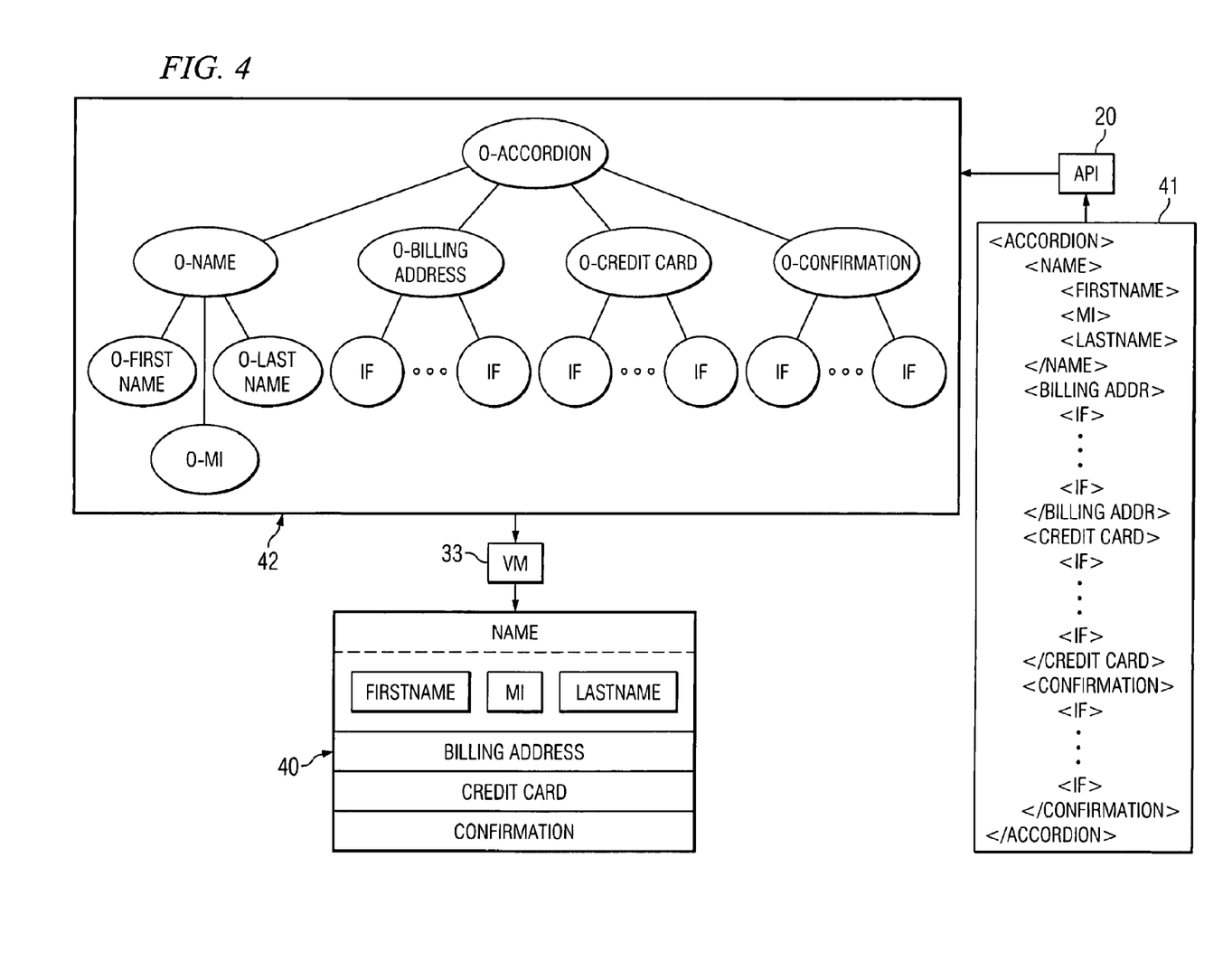
FIG. 4 is a block diagram of a navigational element with associated object tree and descriptor tree configured according to another embodiment of the present invention.

FIG. 4 is a block diagram of navigational element 40 with associated object tree 42 and descriptor tree 41 configured according to another embodiment of the present invention. Navigational element 40 is depicted as an accordion navigator with four interface views named Name, Billing Address, Credit Card, and Confirmation. Navigational element 40 may be one of several navigational elements within a larger application. Descriptor tree 41 is a pseudocode representation of a descriptor for the accordion container of navigational element 40. In the embodiment shown in FIG. 4, when the user first navigates to navigational element 40, the backgrounds for each of the four interface views is initially instantiated from descriptor tree 41. API 20 converts the descriptions of each of the accordion views into rendering objects for object tree 42. For example, descriptor view Name is converted by API 20 into object O-Name in object tree 42. Virtual machine 33 then uses O-Name to render the visual elements of the Name view in accordion navigational element 40.

Because the Billing Address, Credit Card, and Confirmation views are each lower in the stack than the Name view, API 20 only creates objects O-FirstName, O-MI, and 0-LastName for object tree 42, which are then used by virtual machine 33 to render the interface elements on navigational element 40, FirstName, MI, and LastName. If the user moves to a subsequent accordion view, the objects corresponding to the descriptors of the interface elements contained in the view to which the user has navigated, are created by API 20, after which virtual machine 33 uses these objects to render the interface elements on those subsequent views. As the user selects to view Name from one of the subsequent views, virtual machine 33 renders the interface elements of view Name from the corresponding objects that are now in memory.

It should be noted that, in various additional and alternative embodiments of the present invention, selected stacked objects or views may be designated to be fully instantiated regardless of whether the stacked panes or views are visible in the current view.

In should be noted that, in various other additional and alternative embodiments of the present invention, the descriptor nodes and object nodes for interface elements may be pre-instantiated according to other relationships with the currently visible pane, such as a direct link (i.e., a link that typically traverses between two panes or views using only a single user action, such as a single mouse click), an ordinal relationship (i.e., the panes are ordered in a specific order, in which the interface elements of the next view or pane in the order would be pre-instantiated), a statistical relationship (i.e., statistical calculations are performed on users' interactions with the particular RIA or other application to "predict" which of the next views the user is likely to navigate to, in which the interface elements for that likely next view would be pre-instantiated), a positional relationship (i.e., particular views are positioned in some kind of hierarchical or ordinal relationship with the currently visible pane, in which case the interface elements of those closely positioned views would be pre-instantiated), or the like. In such embodiments, the descriptor nodes and object nodes for the interface elements for those related views may be instantiated during "processing" or thinking time in the current view.

Figure 5:
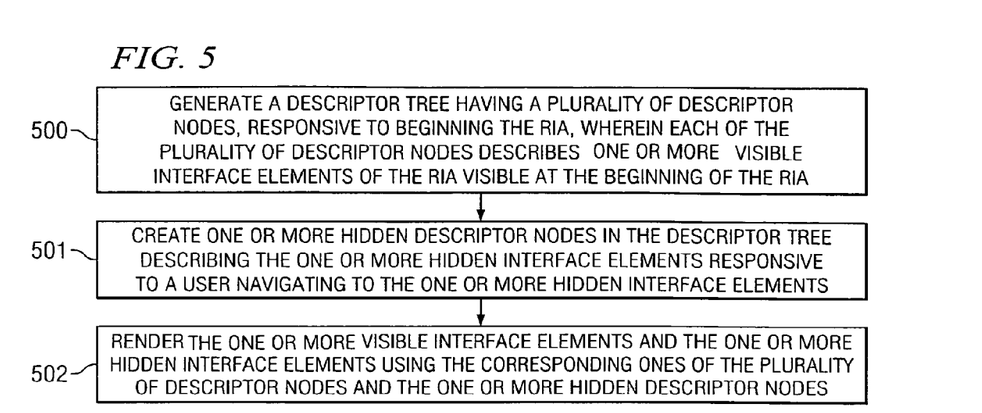
FIG. 5 is a flowchart illustrating steps taken in implementing an additional embodiment of the present invention.

FIG. 5 is a flowchart illustrating steps taken in implementing an additional embodiment of the present invention. In step 500, a descriptor tree is generated having a plurality of descriptor nodes, responsive to beginning the RIA, wherein each of the plurality of descriptor nodes describes one or more visible interface elements of the RIA visible at the beginning of the RIA. One or more hidden descriptor nodes is created in the descriptor tree, in step 501, describing the one or more hidden interface elements responsive to a user navigating to the one or more hidden interface elements. In step 502, the one or more visible interface elements and the one or more hidden interface elements are rendered using the corresponding ones of the plurality of descriptor nodes and the one or more hidden descriptor nodes.

Figure 6:
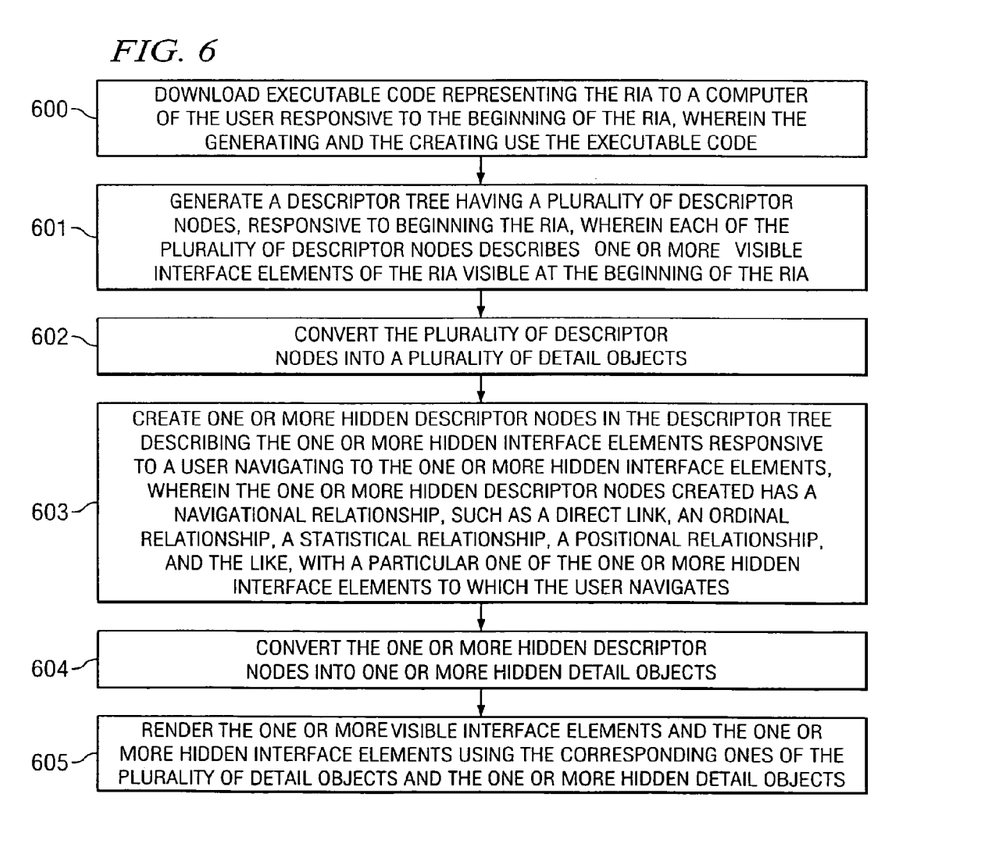
FIG. 6 is a flowchart illustrating steps taken in implementing an additional or alternative embodiment of the present invention

FIG. 6 is a flowchart illustrating steps taken in implementing an additional or alternative embodiment of the present invention. In step 600, executable code is downloaded representing the RIA to a computer of the user responsive to the beginning of the RIA, wherein the generating and the creating use the executable code. A descriptor tree having a plurality of descriptor nodes is generated in step 601, responsive to beginning the RIA, wherein each of the plurality of descriptor nodes describes one or more visible interface elements of the RIA visible at the beginning of the RIA. In step 602, the plurality of descriptor nodes is converted into a plurality of detail objects. One or more hidden descriptor nodes is created in the descriptor tree, responsive to a user navigating to the one or more hidden interface elements, in step 603, describing the one or more hidden interface elements, wherein the one or more hidden descriptor nodes created has a navigational relationship, such as a direct link, an ordinal relationship, a statistical relationship, a positional relationship, and the like, with a particular one of the one or more hidden interface elements to which the user navigates. In step 604, the one or more hidden descriptor nodes is converted into one or more hidden detail objects. The one or more visible interface elements and the one or more hidden interface elements are rendered in step 605 using the corresponding ones of the plurality of detail objects and the one or more hidden detail objects.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed:

1. A computing device, comprising:
   a network interface; and
   a processing element implementing a runtime environment, the runtime environment configuring the processing element to:
   access code of an application to be executed in the runtime environment, the code accessed via the network interface,
   generate a descriptive hierarchical structure from the code based on identifying application code of a first interface element to be shown in an initial view of the application and application code of a second interface element to be shown in a second view of the application,
   instantiate a first object used to render the first interface element of the initial view according to an application programming interface (API) that instantiates the objects based on the descriptive hierarchical structure, and
   determine, based on the descriptive hierarchical structure, to defer instantiation of a second object to be used to render the second interface element of the second view of the application.

2. The computing device of claim 1, comprising a mobile device.

3. The computing device of claim 1, wherein the descriptive hierarchical structure comprises a tree having a plurality of nodes, a root of the tree comprising an application node and leaf nodes of the tree corresponding to different interface elements.

4. The computing device of claim 3, wherein the runtime environment configures the processing element to add subsequent nodes beneath a node of the tree using a child constructor method associated with the node of the tree, the child constructor method comprising a pointer to code usable by the runtime environment to add the subsequent nodes.

5. The computing device of claim 3, wherein at least one of the nodes corresponds to a container element and at least one of the nodes corresponds to an element usable to provide input to the application.

6. The computing device of claim 5, wherein the runtime environment configures the processing element to add a node to the descriptor tree in response to receiving the input.

7. A computer-implemented method, comprising:
   accessing, by a computing device, code representing an application;
   generating, by the computing device and based on the code, a descriptive hierarchical structure representing at least a first view of the application;
   instantiating, by the computing device and based on the descriptive hierarchical structure, an object usable to render an interface element of the application;
   determining, based on the descriptive hierarchical structure, to defer instantiation of a second object corresponding to a second interface element to be shown in a second view of the application;
   rendering the first view of the application using the object, the first view including the interface element; and
   updating, by the computing device, the descriptive hierarchical structure after rendering the interface element.

8. The computer-implemented method of claim 7, further comprising receiving input after the interface element is rendered, wherein updating occurs in response to the input.

9. The computer-implemented method of claim 7, wherein generating the descriptive hierarchical structure comprises generating a tree comprising a root node and at least one leaf node corresponding to an interface element used in rendering the first view of the application.

10. The computer-implemented method of claim 9, wherein updating the descriptive hierarchical structure comprises adding another leaf node corresponding to the second interface element used in rendering the second view of the application different from the first view.

11. The computer-implemented method of claim 10, further comprising instantiating the second interface element in response to updating.

12. The computer-implemented method of claim 11, wherein the second interface element is instantiated while the first view is rendered.

13. The computer-implemented method of claim 7, wherein updating comprises determining a relationship between the first view and the second interface element in the second view and, in response, updating the descriptive hierarchical structure to include the second interface element in the second view.

14. The computer-implemented method of claim 13, further comprising instantiating the second object corresponding to the second interface element in the second view while the first view is rendered.

15. A computing device, comprising:
   a network interface; and
   a processing element implementing a runtime engine that causes the computing device to access data defining an application, generate a descriptor tree based on the data defining the application, and selectively instantiate objects according to the descriptor tree, wherein selectively instantiating comprises instantiating at least one object corresponding to a first interface element used in rendering an initial view of the application and deferring instantiation of at least one second object corresponding to a second interface element used in rendering a second view of the application different than the initial view of the application.

16. The device of claim 15, wherein the descriptor tree comprises a plurality of nodes, the plurality of nodes comprising a root application node and a leaf node.

17. The device of claim 16, wherein generating comprises populating the descriptor tree with at least one leaf node corresponding to the first interface element and selectively instantiating objects comprises instantiating the object corresponding to the first interface element based on identifying the at least one leaf node.

18. The device of claim 17, wherein generating further comprises populating the descriptor tree with at least one second leaf node corresponding to the second interface element and selectively instantiating objects comprises deferring instantiation of the at least one second object until after the descriptor tree is populated with the at least one second leaf node.

19. The device of claim 15, wherein the data defining the application comprises bytecode.

20. The device of claim 15, wherein the network interface and processing element are comprised in a mobile device.

* * * * *